United States Patent [19]

Fund

[11] 4,058,918
[45] Nov. 22, 1977

[54] VEHICLE PLACARDING APPARATUS
[75] Inventor: Harry Fund, Chicago, Ill.
[73] Assignee: Modular Products Corporations (Labelmaster Division), Chicago, Ill.
[21] Appl. No.: 714,840
[22] Filed: Aug. 16, 1976
[51] Int. Cl.$^2$ ............................................. G09F 21/04
[52] U.S. Cl. ................................. 40/129 C; 40/102; 40/104.18
[58] Field of Search ................ 40/129 C, 102, 104.18, 40/152, 158 R

[56] References Cited
U.S. PATENT DOCUMENTS

| | | | |
|---|---|---|---|
| 1,685,080 | 9/1928 | Auchincloss | 40/104.18 |
| 1,727,336 | 9/1929 | Cooper | 40/104.18 |
| 3,455,044 | 7/1969 | Falconbridge et al. | 40/102 X |
| 3,481,060 | 12/1969 | Hartz | 40/129 C X |
| 3,496,666 | 2/1970 | Morley | 40/129 C |
| 3,518,782 | 7/1970 | Long | 40/104.18 |
| 3,807,071 | 4/1974 | Candor | 40/152 X |

Primary Examiner—John F. Pitrelli
Attorney, Agent, or Firm—Burns, Doane, Swecker & Mathis

[57] ABSTRACT

Placarding systems for vehicle sides and roll-up vehicle doors include imprinted plates hinged to a base, which plates may be selectably oriented and clipped to the base so that the exposed faces of the plates define a diamond-shaped area bearing a single inscription.

2 Claims, 4 Drawing Figures

VEHICLE PLACARDING APPARATUS

BACKGROUND OF THE INVENTION

This invention relates to the selective placarding of vehicles. More particularly, this invention relates to vehicle placarding apparatus which provides for convenient changes of the indication of cargo contents.

Motor and rail vehicles have long been placarded to indicate the nature or contents of cargo carried by the vehicle. Known placarding means include imprinted, adhesive backed cards pasted to the vehicle and imprinted plates mechanically attached to the vehicle by bolts, rivets or the like. These placarding means have a disadvantage in that the placarding cannot be rapidly and economically changed to reflect the often frequent changes in the vehicle cargo.

Another known placarding system provides an elongated rectangular inscription area formed by a plurality of generally rectangular plates with their transverse edges hinged at a bisector of the elongated rectangle so that the plates may be turned like the pages of a book to change the placarded inscription. Multiple spring clips mounted on a rigid base member are located at cutaway corners of both transverse edges of the elongated rectangle to selectively maintain the plates in position against the rigid base member. A raised ledge is integral with the base member along the edges thereof parallel to the elongate rectangle edges, but the transverse edges of the base member are flat.

Recently, the Department of Transportation has promulgated new requirements for the placarding of vehicles carrying hazardous materials in commerce. Those requirements, set out in Vol. 41, No. 74 of the Federal Register, Apr. 15, 1976, prescribe that a diamond-shaped placard of specified dimensions be affixed to the front, rear and sides of vehicles carrying hazardous materials.

It would be desirable to provide a placarding system that would meet those requirements while providing for changes of the placard inscription.

The new requirements present particular difficulty with respect to the placarding of vehicles having roll-up doors, which may include the entire rear vertical surface of the vehicle available for placarding. The difficulty results because the diagonal length of the diamond-shaped placard now required in most cases exceeds the height of the hinged rectangular sections which normally comprise the roll-up doors. Hence, known rigid, planar placards, reconfigured in a diamond-shape, cannot be used on roll-up doors, since they interfere with the operation of the door. Accordingly, it would be desirable to provide a diamond-shaped placarding apparatus suitable for use with roll-up vehicle doors.

OBJECTS AND SUMMARY OF PREFERRED EMBODIMENTS

It is a general object of the present invention to provide novel vehicle placarding systems having diamond-shaped placards presenting conveniently changeable displays of inscriptions.

It is a particular object of the present invention to provide such a novel vehicle placarding system where hinged placard leaves are protected by framing on all sides to militate against wind and other damage.

It is a further object of the present invention to provide such a system wherein turning of the placard leaves is facilitated by particular location of the hinges, retention clips and finger access zones relative to the side framing.

It is an independent object of the present invention to provide a novel vehicle placarding system having diamond-shaped placards presenting conveniently changeable displays of inscriptions, which system is suitable for use with roll-up vehicle doors.

These and other objects may be achieved through preferred embodiments of the present invention.

A first preferred embodiment of the present invention is an apparatus for placarding a vehicle with a plurality of selectively exposable inscriptions on diamond-shaped backgrounds. The apparatus includes a base member, a plurality of rectangular plates, mounting means for the plates and means for selectively clipping the plates to the base member. The base member itself comprises an equilateral, diamond-shaped central portion and a framing section raised from the square central portion, and lying along essentially the entire perimeter of the central portion. The base member is adapted to be attached to the vehicle so that the framing member projects outwardly from the vehicle and from the central portion, and so that diagonally opposite vertices of the square central portion lie on a vertical axis. The plurality of rectangular plates have longitudinal edges of approximately the same length as a side of the central portion and have transverse edges of about half the length of a side of the central portion. The mounting means is operable to pivotally attach each of the rectangular plates to the base member so that the plates are pivotable about a common axis approximately parallel to a longitudinal edge of each plate, which axis approximately bisects one set of parallel sides of the framing section. Manually operable clip means are mounted on the other set of parallel sides of the framing section for selectively retaining the plates in parallel contact with the central portion. The rectangular plates are located and bear indicia so that surfaces of two of the plates, facing outwardly simultaneously, are adapted to collectively define a diamond-shaped area displaying an inscription, split along the common pivoting axis and framed by the framing member.

Advantageously, the pivoting means may comprise a pair of U-shaped members with the legs thereof attached to the central portion of the base member, which U-shaped members pass through apertures in each of the plurality of rectangular plates to loosely bind a longitudinal edge of each plate to the base member. The clipping means may comprise two spring clips on the framing member, one on each side of the common pivoting axis. Cutouts may be formed in the framing member about the vertices of the square central portion to provide access for selection and manual grasping of the rectangular plates. Apertures may be formed in the base member at the cutouts, the apertures being adapted to receive means for affixing the base member to the vehicle.

A second embodiment of the present invention is an apparatus for providing changeable placarding for a roll-up vehicle door formed of a plurality of articulated, rigid rectangular sections, consecutively hinged along horizontal axes. The apparatus may comprise two separate base members, two groups of generally triangular plates, means for pivotally attaching the plates to the bases, and means for selectively clipping the plates to the bases. A first base member is adapted to be attached to a first rectangular door section, and a second base member is adapted to be attached to a second rectangular door section adjacent the first rectangular door section.

A first plurality of generally congruent, right triangular plates is provided with means for pivotally attaching each of the first plurality of plates to the first base member, so that the plates are pivotable about a common axis approximately parallel with parallel congruent edges of each of the plates. A second plurality of generally congruent, right triangular plates is provided with means for pivotally attaching each of the second plurality of plates to the second base member, so that those plates are pivotable about a common axis approximately parallel with parallel congruent edges of the plates. Selectively operable means on said first and second base members are provided for clipping the triangular plates to their respective base members to retain the plates in a plane approximately parallel to the plane of the door sections to which the respective base members are attached.

The triangular plates bear indicia and are located such that surfaces of four triangular plates, facing outwardly simultaneously, are adapted to define a diamond-shaped area bearing a single inscription, split at about the horizontal axis along which the first and second door sections are hinged and split at the common pivoting axes.

Advantageously, the first pivoting means of the above-described placarding apparatus may comprise at least one U-shaped member with the legs thereof attached to said first base member, which U-shaped member passes through apertures in each of said first plurality of triangular plates. Likewise, the second pivoting means may comprise at least one U-shaped member with the legs thereof attached to said second base member. The clipping means may comprise a plurality of spring clips for engaging each of the four simultaneously outward facing triangular plates along a perpendicular bisector of the hypotenuse of each triangular plate. Each triangular plate may be formed with a tab means protruding from the hypotenuse thereof to facilitate identification and manual selection of the plate.

Other objects and advantages of the present invention will become apparent from the subsequent detailed description of preferred forms thereof, in connection with the accompanying drawings, in which:

THE DRAWINGS

DETAILED DESCRIPTION

Figure 1:
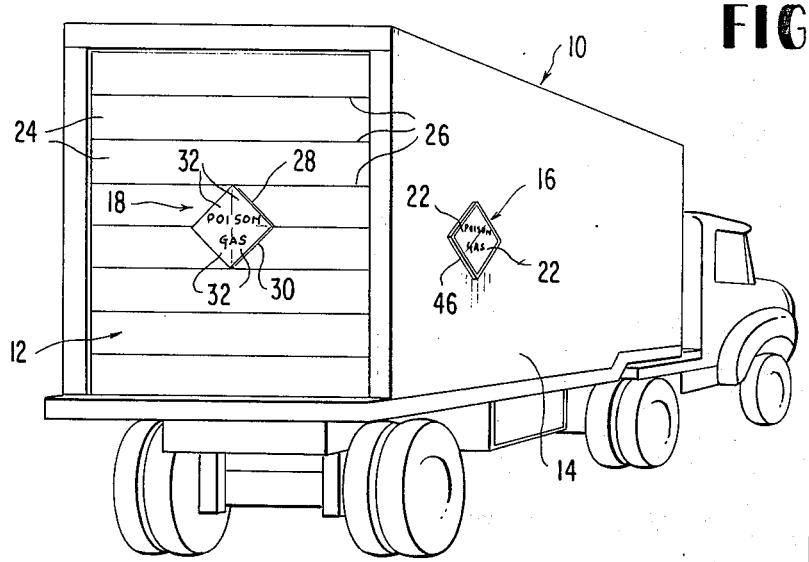
FIG. 1 is a pictorial view of a truck having a rear roll-up door and placarded with placarding apparatus according to two embodiments of the present invention.

Referring first to FIG. 1, a vehicle 10 with a rear roll-up door 12 is shown bearing placarding systems according to two embodiments of the present invention. To comply with current federal regulation, a motor vehicle carrying hazardous materials must be placarded on its front, sides and rear. Accordingly, the vehicle shown in FIG. 1 may be placarded with a first embodiment 16 of the present invention on its front (not shown) and its lateral sides. The roll-up door may be placarded with a second embodiment 18 of the present invention.

The vehicle shown in FIG. 1 is placarded on its lateral side 14 with the placarding apparatus 16 of the first embodiment having a one-piece diamond-shaped base. The placarding apparatus 16 on the side of the vehicle includes a raised perimetric framing section 46, integral with the base, to protect plates 22 bearing the appropriate inscription from scraping impact or other damage.

The roll-up door 12 of the vehicle is placarded with a second embodiment 18 of the present invention. As will be appreciated, conventional roll-up doors comprise a series of rectangular sections 24, each hinged along at least one horizontal edge (e.g., edges 26) to an adjacent rectangular section. When the door is opened, upper sections of the door pivot in a horizontal direction with respect to adjacent lower sections of the door, so that the upper portion of the door may be located in a storage position directly under the roof or upper horizontal plane of the vehicle.

Figure 4:
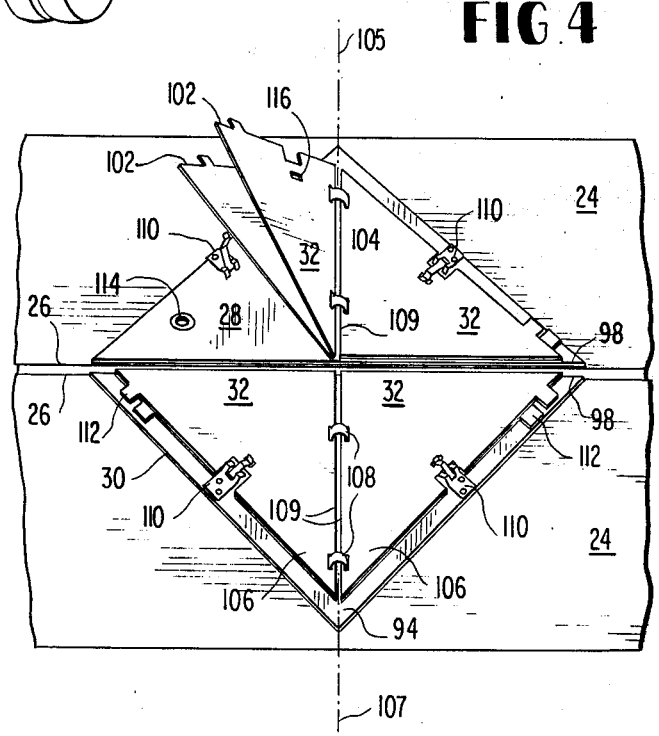
FIG. 4 is a pictorial view of a second embodiment of the placarding apparatus of the present invention, shown mounted on a portion of a roll-up vehicle door.

The placarding apparatus of the present invention, intended primarily for use with such a roll-up door (but, of course, usable at vehicle sides if desired), is shown in more detail in FIG. 4. As illustrated there and in FIG. 1, the apparatus 18 comprises first and second triangular base members 28 and 30. The height of each of those base members is less than the height of the rectangular door sections 24 to which the members are attached. At least four triangular plates 32, bearing a portion of an inscription, may be attached to the base members. In this connection, hinges are provided as will be described in greater detail in connection with FIG. 4. Surfaces of the plates 32 may be selectively exposed to display the desired inscription.

Figure 2:
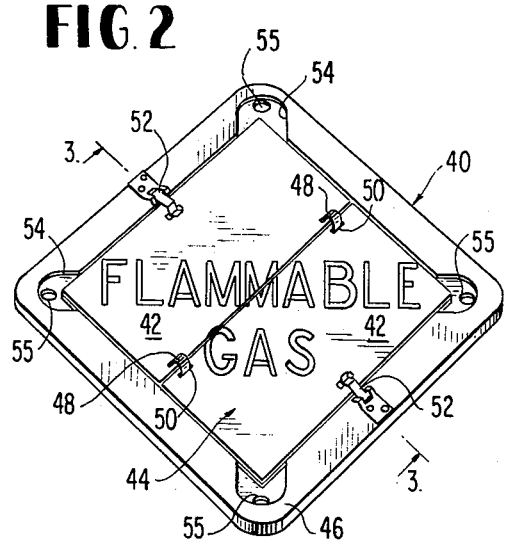
FIG. 2 is a pictorial view of a placarding apparatus according to one embodiment of the present invention.
Figure 3:
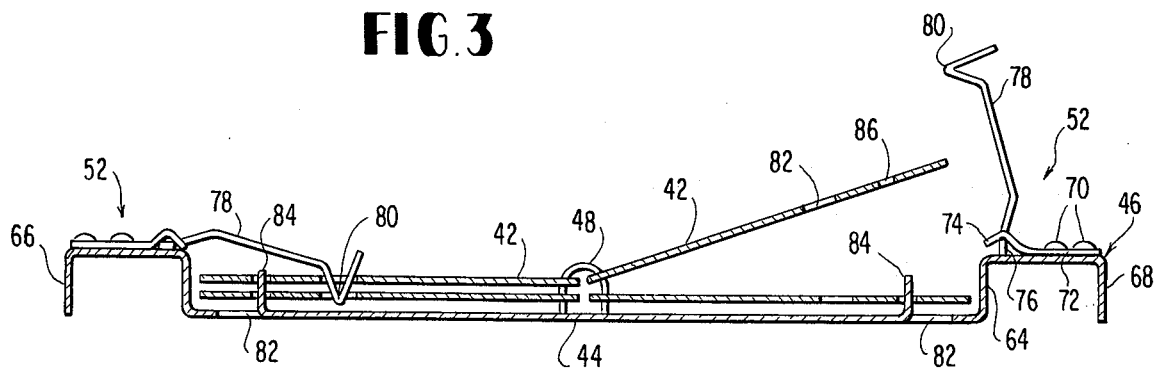
FIG. 3 is a cross-sectional view taken along line 3-3 of FIG. 2.

With reference to FIGS. 2 and 3, the placarding apparatus 16 depicted on the side of the vehicle 10 of FIG. 1 may be more fully appreciated. This placarding apparatus 16 comprises a base member 40 and a plurality of imprinted rectangular plates 42. The base member 40 is formed with a diamond-shaped central portion 44 in which the rectangular plates 42 are displayed. A raised frame section 46 is disposed about essentially the entire perimeter of the diamond-shaped portion. Advantageously, the central portion 44 has equal sides as shown.

The rectangular plates 42 are attached to the base member by hinges 48 located along a line bisecting two opposite sides of the frame section 46. These hinges are U-shaped members attached to the central portion 44 of the base member and pass through apertures 50 along adjacent edges of the rectangular plates. Spring clips 52, attached to the raised perimeter 46 of the base plate, selectively retain the rectangular plates against the central portion 44 in the base member 40. Cutout zones 54 in the perimeter of the base plate may be provided at the corners to permit easy access to vertices of the rectangular plates 42 so as to facilitate grasping of the edges of the rectangular plates with the fingers in order to select the plates bearing the desired inscription. Apertures 55 may be formed in the base member at the cutouts. The apertures 55 are adapted to receive suitable fastening means for affixing the base member to the vehicle. Other such apertures can be provided at other locations on the central portion 44 of the base member if desired.

As may be seen in FIG. 3, the raised frame section 46 of the base member 40 is generally U-shaped in cross section. In this connection, the frame section comprises an upstanding wall 64 projecting upwardly from the diamond-shaped, planar central portion 44 of the base member 40, a frame wall 66 offset from the plane of the central portion 44, and a depending skirt 68.

The spring clips 52 are attached to the offset frame wall 66 by rivets 70 or the like. The illustrated spring clips 52 comprise a base plate 72 having spring legs 74 that capture a pivot arm 76 of a latch 78. The latch includes a projection 80 at its leading end, which projection fits through apertures 82 in the plates 42 to hold the plates 42 in position against the central portion 44 of the base. For convenience, in FIG. 3 one spring clip 52 is shown in an engaged condition, while the other is shown disengaged. If desired, other forms of retention means may be employed to maintain the plates 42 in their selcted display position after turning the plates about the hinges 48. Moreover, the central portion 44 of the base may be cut out, as indicated at 82, to provide tubes 84 which may be upturned to cooperate with locating apertures 86 in the plates 42.

The operation of the embodiment of the present invention shown in FIGS. 2 and 3 will now be described. As shown in FIG. 2, the exposed faces of the outermost rectangular plates 42 collectively define a diamond-shaped area bearing a single inscription. When it is desired to change the exposed inscription as, for example, when the cargo of the vehicle has been changed, the change may be effected in the following way. Spring clips 52 may be oriented to release the rectangular plates 42. The vertex of one of the rectangular plates may be manually grasped with the fingers at one of the cutouts 54. One or a number of the rectangular plates may be turned about the axis defined by the hinges 48 like pages of a book. As each rectangular plate is pivoted 180 degrees about the axis defined by the hinges, the exposed faces of the outermost rectangular plates will define a diamond-shaped area bearing a different single inscription. When the desired inscription is selectively exposed, the spring clips 52 may be reoriented to engage the rectangular plates.

With reference now to FIG. 4, the apparatus 18, adapted for use on a roll-up door, will be appreciated. The previously mentioned first and second triangular shaped base members are adapted for attachment in any suitable manner to adjacent rectangular sections 24 of the roll-up door, with edges 98 of the triangular base members disposed substantially adjacent to one another along the hinged edges 26 of the first and second rectangular door sections.

A first plurality of congruent right triangular plates 32 is attached to the first base 28 by means of hinges 104 to permit the pivoting of the triangular plates about an axis 105 defined by those hinges 104. Similarly, a second plurality of congruent right triangular plates 32 is attached to the second base member 30 by means of hinges 108 that define a pivoting axis 107 parallel to congruent leg edges 109 of the triangular plates. The base members 28 and 30 are located on the rectangular sections of the roll-up door 12 so that the exposed faces of the outermost triangular plates collectively define a square, diamond-shaped area bearing an inscription. It will be clear that the edges of the diamond-shaped area are the hypotenuses of the triangular plates, and that the diamond-shaped area is quartered by the horizontal hinge axis of the articulated door sections 24 and the pivoting axes 105, 107 of the triangular plates.

Spring clips 110 may be attached to the base members along the perimeter of the diamond-shaped area collectively defined by the triangular plates to selectively maintain the triangular plates in contact with the base members to prevent the pivoting of the plates about the axes 105 and 107. These spring clips 110 may be substantially identical to those described in connection with FIG. 3. Tab members 112 may be provided on the hypotenuse of each of the triangular plates to facilitate manual selection and pivoting of the plates to expose the desired inscription. Raised locating bosses 114 cooperable with plate apertures 116 may be formed in the base members to help in correct location of the plates.

A change in the exposed indicia of the second embodiment of the present invention may be effected in the following way. The spring clips 110 may be oriented to release the plates 32. The tabs 112 on the plates may be grasped to pivot and thereby selectively expose the appropriate surfaces of the plates. The tabs may be appropriately marked to indicate that the exposed surfaces of the plates are properly grouped to define a complete and correct inscription. When the desired inscription is exposed, the spring clips 110 may be reoriented to again engage the plates 102 and 106.

Although the invention has been described with reference to preferred forms thereof, it will be appreciated that additions, modifications, substitutions and deletions may be made without departing from the spirit and scope of the invention as defined in the appended claims.

What is claimed is:

1. An apparatus for placarding a vehicle with a plurality of selectively exposable inscriptions on diamond-shaped backgrounds comprising:

a base member comprising an equilateral, diamond-shaped central portion and a framing section raised from the square central portion and lying along substantially the entire perimeter of the central portion of the base member, said base member being attachable to the vehicle so that the framing section extends outwardly from the vehicle and from the central portion, and so that diagonally opposite vertices of the central portion lie on a vertical axis;

a plurality of rectangular plates having longitudinal edges of approximately the same length as a side of the central portion and having transverse edges of approximately half the length of the central portion;

means for pivotally attaching each of the rectangular plates to the base member so that the plates are pivotable about a common axis approximately parallel to a longitudinal edge of each plate, which axis approximately bisects two parallel sides of said framing section;

manually operable means mounted on the other two sides of said framing section for clipping the rectangular plates to the base member to selectively retain the plates in parallel contact with the central portion;

said plates being located and having indicia so that the surfaces of any two of the plates facing outwardly simultaneously collectively define a diamond-shaped area displaying an inscription, split along the common pivoting axis and framed by the framing section; and, said framing section being raised from the central portion a sufficient amount so that the plurality rectangular plates lay in the recess formed by said framing section and are thereby protected from being moved and damaged by stationary projections along the path of the vehicle which would otherwise catch edges of the rectangular plates as the vehicle is driven by the stationary projections cutouts are formed in the framing section about the vertices of the central portion to provide access for selection and manual grasping of the rectangular plates; and, said framing section comprises:

wall portions projecting perpendicularly to the central portion and located about the perimeter of the central portions; a frame wall portion attached to the wall portion and disposed in a plane parallel to the plane of the central portion; and a frame skirt portion depending from said frame.

2. The apparatus of claim 1 wherein the manually operable clipping means comprises a single spring clip on the first of the other two sides of said framing section and a single spring clip on the second of the other two sides of said framing section; and, apertures are formed in said cutouts to facilitate attachment of the base member to the vehicle.

* * * * *